Figure 1:
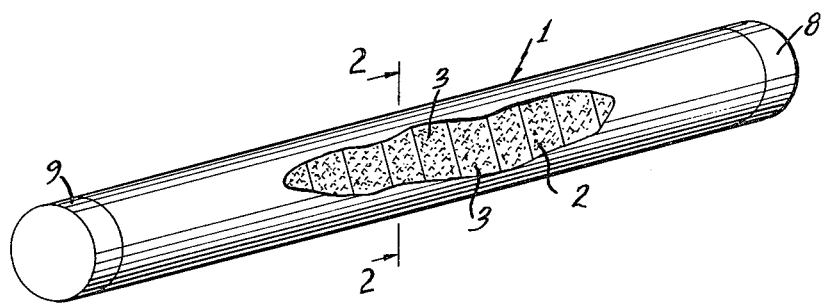

July 16, 1963 G. H. BARNEY ET AL 3,098,024
COMPOSITE FUEL ELEMENTS FOR NUCLEAR REACTORS
Filed Jan. 27, 1959

INVENTORS
GREENLIEF H. BARNEY
LAWRENCE C. BURMAN
BY Karl Huber
James E. Bryan
Alan C. Rose
ATTORNEYS

United States Patent Office

3,098,024
Patented July 16, 1963

3,098,024
COMPOSITE FUEL ELEMENTS FOR NUCLEAR REACTORS
Greenlief H. Barney, Attleboro, Mass., and Lawrence C. Burman, New York, N.Y., assignors, by mesne assignments, to Engelhard Industries, Inc., Newark, N.J., a corporation of Delaware
Filed Jan. 27, 1959, Ser. No. 789,447
3 Claims. (Cl. 204—193.2)

The present invention deals with composite fuel elements for nuclear reactors.

Some known types of fuel elements for nuclear reactors comprise composite rods composed of a core of natural or enriched fissionable material such as uranium, or an alloy of uranium and aluminum, or an alloy of uranium and zirconium, or uranium dioxide, each containing, for example, sufficient uranium 233, or uranium 235, or plutonium 239 to sustain a chain reaction, and clad with a corrosion resistant metal such as aluminum, zirconium or stainless steel to protect the core from corrosion through chemical reaction with air, water, sodium or other coolants employed in reactors and to prevent the escape of fission products.

In fuel elements of the above-mentioned types, the heat energy of the nuclear reaction is generated substantially uniformly throughout the core mass with a portion of the primary fissionable material, e.g. uranium 235, being consumed in the production of energy, as heat, and in the conversion of fertile material to fissionable material. Reactor fuels more recently have been employing uranium in the form of uranium dioxide because of the superior life in comparison with uranium metal and alloys. Natural uranium metal fuels have a maximum life on the order of 2000–3000 megawatt days per ton of uranium. Uranium dioxide fuels can be expected to have a fuel life on the order of 10,000 megawatt days or more per ton of uranium. For thermal reactors, uranium dioxide is required to be enriched in the range of about 1.0% to about 3.0%–5.0%, above the uranium 235 level of natural uranium metal because of its lower density. A disadvantage of uranium metal lies in the fact that under irradiation it undergoes physical changes causing it to swell and otherwise change shape, whereas uranium dioxide under irradiation does not alter its physical condition to any marked degree. Uranium-zirconium, and uranium-molybdenum alloys improve the swelling characteristics of uranium metal but the permissible burn-up does not reach the 10,000 megawatt days per ton of uranium attainable with oxide fuels. However, uranium dioxide has a disadvantage in that it is a poor conductor of heat. In slightly enriched uranium dioxide fuels clad with, for example, stainless steel, or zirconium, or a zirconium alloy, the heat of the nuclear reaction is generated substantially uniformly throughout the uranium dioxide. Because of the poor heat transfer of uranium dioxide, a ceramic, the internal temperature of the uranium dioxide, slightly enriched, has been known to restrict the operating conditions of nuclear reactors.

It is an object of the present invention to provide a nuclear fuel element having a structure which promotes heat transfer from the nuclear fuel to the cladding material more efficiently than is the case with enriched uranium dioxide pellets enclosed within a protective sheath, retaining also the life characteristics of oxide fuels.

It is another object of the present invention to provide a composite nuclear reactor fuel rod which provides for efficient heat transfer between the fuel material and the cladding thereon.

Figure 2:
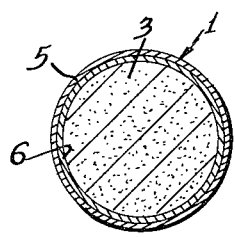
Figure 3:
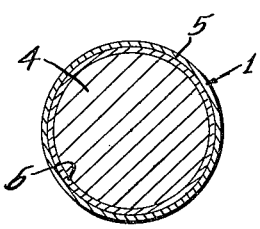

Other objects of the present invention will become apparent from the description hereinafter following and the drawing forming a part hereof, in which:

FIGURE 1 illustrates a partly broken away isometric view of a fuel rod according to the invention,
FIGURE 2 illustrates an enlarged cross-sectional view along lines 2—2 of FIGURE 1, and
FIGURE 3 illustrates a cross-sectional view of a modification of FIGURE 1.

The invention relates to a composite fuel rod for nuclear reactors and having a structure whereby a substantial portion of the heat energy generated in the fuel is generated in a narrow annulus immediately adjacent to and in direct contact with the metal cladding of the fuel material and thereby providing an improved heat transfer from the fuel to the coolant through the cladding metal.

Referring to FIGURES 1, 2 and 3 the invention comprises a fuel element preferably in the form of a composite rod 1 and composed of a core 2, either in the form of compacted and sintered uranium dioxide powder, e.g., in the form of compacted and sintered pellets 3, or metal or metal alloy rods 4, and the core being clad with a laminar tube composed of a corrosion resistant outer metal layer 5 and a metal lining 6 of an alloy of fissionable material, preferably enriched in uranium 235.

The core 2 comprises a material selected from the group consisting of uranium and thorium metal and compounds thereof, e.g., uranium dioxide and thorium oxide, such as either depleted, natural or enriched uranium or uranium dioxide. Preferably, the core comprises depeleted or natural uranium which contains about 0.7 percent uranium 235. In addition to the above, the core is advantageously in the form of compacted and sintered uranium dioxide pellets or rods to which is added sodium or lead as a filler material in order to further improve heat transfer between the core and the composite rod sheath.

The outer corrosive resistant layer 5 is composed of zirconium, or a zirconium alloy, or aluminum, or an alloy of aluminum, or stainless steel, or other similar corrosion resistant material.

The lining 6 is composed of enriched uranium metal, or an enriched aluminum-uranium alloy containing, e.g. up to about 45 percent uranium, or enriched uranium dioxide dispersed in a stainless steel matrix or an enriched zirconium-uranium alloy containing, e.g., up to about 70 percent uranium, in each case the uranium being enriched, e.g., up to about 90 percent uranium 235.

The outer corrosion resistant layer 5 and inner layer or lining 6 comprise a laminated tube. The metallurgical bond between the two layers 5 and 6 is provided by well-known methods, e.g., coextrusion of inner and outer tubes. The layers 5 and 6 may also be mechanically bonded by the well-known methods of drawing and swaging.

Preferably, the core comprises uranium dioxide either in the natural or depleted condition, which in comparison with other uranium dioxide fuel elements containing enriched uranium, reduces the proportion of heat generated in the center of the rod, while a major portion of heat energy is generated in the enriched lining which is metallurgically bonded to the outer layer providing improved heat transfer to the outer corrosion resistant layer. Alternatively, the inner and outer layers 5 and 6 are mechanically bonded one to the other.

The composite rod according to the invention is fabricated, for example, by first providing a laminar tube composed of the outer layer 5 and the lining 6, filling the tube with a core material 3 or 4, providing end caps or plugs 8 and 9 and reducing the composite rod to finished size by swaging, drawing or extrusion.

Having provided the composite rod hereabove set forth, it is apparent that the rod consists of a core 2 clad with a corrosion resistant outer metal layer 5 lined with an enriched nuclear fuel metal lining 6, which generates a substantial proportion of the heat energy available in an annulus immediately adjacent to the outer metal layer and is thereby capable of increased heat transfer thereto and to the coolant.

While the invention specifically describes a fuel element in the form of a rod, various modifications thereof such as tubes and plates are contemplated within the scope of the appended claims.

What is claimed is:

1. A fuel element for nuclear reactors comprising a core clad with a laminated metal, the core comprising a material selected from the group consisting of natural uranium and thorium metal and compounds thereof, the laminated metal consisting of an outer layer of one of the metals taken from the group consisting of zirconium and stainless steel bonded to and in direct contact with an inner layer, the inner layer being composed of a metal taken from the group consisting of zirconium and stainless steel containing enriched uranium, the outer and inner layers being composed of similar metals.

2. A fuel element according to claim 1, wherein the outer layer is zirconium and the inner layer is composed of an enriched zirconium-uranium alloy containing up to seventy percent uranium.

3. A fuel element according to claim 1, wherein the outer layer is stainless steel and the inner layer is composed of enriched uranium dioxide dispersed in a stainless steel matrix.

References Cited in the file of this patent

UNITED STATES PATENTS

| | | |
|---|---|---|
| 2,820,751 | Saller | Jan. 21, 1958 |
| 2,852,460 | Abbott et al. | Sept. 16, 1958 |
| 2,853,446 | Abbott et al. | Sept. 23, 1958 |
| 2,854,738 | Gray | Oct. 7, 1958 |
| 2,894,320 | Gurinsky et al. | July 14, 1959 |
| 2,914,454 | Gurinsky et al. | Nov. 24, 1959 |
| 2,920,025 | Anderson | Jan. 5, 1960 |
| 2,928,168 | Gray | Mar. 15, 1960 |

OTHER REFERENCES

International Conference on Peaceful Uses of Atomic Energy, 1955, vol. 9, pp. 179–202.